(12) United States Patent
Hoang

(10) Patent No.: US 7,771,111 B2
(45) Date of Patent: Aug. 10, 2010

(54) LIQUID PHASE REACTOR

(75) Inventor: Manh Hoang, South Clayton (AU)

(73) Assignee: Ceramic Fuel Cells Limited, Victoria (AU)

( * ) Notice: Subject to any disclaimer, the term of this patent is extended or adjusted under 35 U.S.C. 154(b) by 436 days.

(21) Appl. No.: 10/472,504

(22) PCT Filed: Mar. 20, 2002

(86) PCT No.: PCT/AU02/00338

§ 371 (c)(1),
(2), (4) Date: Dec. 15, 2003

(87) PCT Pub. No.: WO02/076609

PCT Pub. Date: Oct. 3, 2002

(65) Prior Publication Data

US 2004/0089973 A1    May 13, 2004

(30) Foreign Application Priority Data

Mar. 22, 2001   (AU) .................................. PR 3914

(51) Int. Cl.
*B01F 7/00*       (2006.01)
*B29C 47/38*    (2006.01)

(52) U.S. Cl. ............... 366/318; 264/211.21; 425/131.1; 425/208; 366/79; 366/133; 366/157.2

(58) Field of Classification Search ................... None
See application file for complete search history.

(56) References Cited

U.S. PATENT DOCUMENTS

| | | | | |
|---|---|---|---|---|
| 2,696,960 A | * | 12/1954 | Howard | 244/155 A |
| 2,958,516 A | * | 11/1960 | Wall et al. | 366/138 |
| 3,164,375 A | * | 1/1965 | Frenkel | 366/88 |
| 3,532,316 A | | 10/1970 | Mathes et al. | |
| 3,752,449 A | * | 8/1973 | Schwab et al. | 366/88 |
| 3,831,907 A | | 8/1974 | Claes et al. | |
| 3,926,654 A | | 12/1975 | Claes | |
| 3,989,434 A | * | 11/1976 | Mercer | 425/207 |
| 4,128,342 A | * | 12/1978 | Renk | 366/99 |
| 4,275,033 A | * | 6/1981 | Schulte et al. | 422/133 |
| 4,350,663 A | * | 9/1982 | McAlister | 422/137 |
| 4,897,236 A | * | 1/1990 | Rabiger et al. | 264/211.23 |
| 4,990,300 A | * | 2/1991 | Rebers | 264/328.6 |
| 5,126,171 A | * | 6/1992 | Katsuno et al. | 427/387 |
| 5,227,111 A | * | 7/1993 | Brangers et al. | 264/211.23 |
| 5,316,556 A | * | 5/1994 | Morris | 29/623.3 |
| 5,332,309 A | * | 7/1994 | Ramazzotti et al. | 366/88 |

(Continued)

FOREIGN PATENT DOCUMENTS

DE         199 38 499 A1      2/2001

(Continued)

*Primary Examiner*—Jeffrey Wollschlager
(74) *Attorney, Agent, or Firm*—Birch, Stewart, Kolasch & Birch, LLP.

(57) ABSTRACT

A liquid phase continuous reactor which includes a screw rotatably disposed within a barrel and defining a mixing zone therebetween whereby the relative rotation of the screw with respect to the barrel is adapted to axially transport materials disposed between the screw and the barrel while mixing the components wherein the land surface area between the spiral groove forms at least 50% of the surface area of the screw in a mixing zone.

15 Claims, 1 Drawing Sheet

U.S. PATENT DOCUMENTS 5,770,141 A * 6/1998 Schulte et al. .............. 264/311
5,902,042 A    5/1999 Imaizumi et al.

FOREIGN PATENT DOCUMENTS

| | | |
|---|---|---|
| DE | 100 44 013 A1 | 3/2002 |
| EP | 0090148 * | 10/1983 |
| EP | 0 409 079 A2 | 1/1991 |
| FR | 2 299 077 | 8/1976 |
| FR | 2299077 A | 8/1976 |
| GB | 1 356 922 | 6/1974 |
| GB | 1 358 157 | 6/1974 |
| GB | 2 215 327 A | 9/1989 |
| JP | 5427584 B | 3/1979 |
| JP | 62-82007 A | 4/1987 |
| JP | 1-207121 A | 8/1989 |
| JP | 9-902 A | 1/1997 |
| JP | 10-29213 A | 2/1998 |
| JP | 2000-61291 A | 2/2000 |
| JP | 2000-86342 A | 3/2000 |
| WO | WO0126804 * | 4/2001 |

* cited by examiner

LIQUID PHASE REACTOR

This application is the national phase under 35 U.S.C. §371 of PCT International Application No. PCT/AU02/00338 which has an International filing date of Mar. 20, 2002, which designated the United States of America.

BACKGROUND OF THE INVENTION

The present invention relates to a liquid phase reactor. More specifically, the invention relates to a continuous flow reactor for liquid phase processing, for example to produce precursors for solid products and to mix multi-phase liquid systems. The invention also relates to a process for conducting liquid phase reactions in a reactor to produce, for example, precursors for solid products and to a process for mixing multi-phase liquid systems in a reactor.

Liquid phase processing such as wet chemistry processing can be performed in a reactor such as a batch reactor, continuous stirred tank reactor or plug flow reactor. Batch reactors allow reactants to react together in a vessel over a period of time. During the reaction, other reactants optionally may be added. The product formed is discharged at the end of the process. For batch reactors to be industrially useful they are often of large volume and consume large amounts of energy when high turbulent mixing is required.

Continuous stirred tank reactors operate continuously with out-flow being equal to total feed streams. Often the reactors are in series and, like batch reactors, are of a large total volume and require high turbulent mixing.

Plug flow reactors allow reactants to flow into the reactor without back-mixing. The rate of reaction is highest in the first part of the reactor where the concentrations of the reactants are highest. Plug flow reactors are more suitable for reactions of high reaction rates. However, the reactions can be difficult to follow and do not allow for compensation of times or conditions during production runs.

Extruders have been proposed for conducting reactions to produce plastics and other organic material. For example U.S. Pat. No. 5,266,256 describes a twin-screw extruder for the polymerisation of methyl methacrylate in which the residence time of the reactants in the extruder is increased.

SUMMARY OF THE INVENTION

It has now been found in accordance with the invention that precursors for solid products can be prepared from reactants in the liquid phase in an extruder-type reactor. Reactors of the present invention can achieve high production rates with a reactor size significantly smaller than batch or continuously stirred tank reactors, provide better product of more uniform quality and reduce the fixed operation costs of performing wet chemistry reactions. Reactors of the present invention can also be used to effectively mix multi-phase liquid systems such as paints, inks and pharmaceuticals.

According to the present invention there is provided a liquid phase continuous reactor comprising a screw within a barrel, the screw and the barrel being relatively rotatable and defining a mixing zone therebetween, the barrel having at least one inlet for the introduction of components for mixing into the barrel and an outlet for discharge of product from the barrel, the screw having at least one spiral groove whereby relative rotation of the screw and barrel is adapted to axially transport the components between the screw and the barrel while mixing the components and to extrude the product through the outlet, wherein the land surface area between the spiral groove forms at least 50% of the surface area of the screw in the mixing zone. Preferably, the turbulence imparted to the components during the mixing is at least about 25,000 Reynolds number (R), preferably from 25,000 to 100,000 R.

The liquid phase reactor of the present invention is particularly suited for processing multi-phase liquids, but may be used for slurry mixing and/or homogenization, advantageously at rotational speeds sufficient to achieve high turbulence in the components in the reactor.

Thus, also according to the present invention there is provided a process for mixing or homogenizing components such as multi-phase liquids in a reactor in accordance with the invention which comprises introducing the components to the mixing zone through the one or more inlets, relatively rotating the screw and the barrel to produce the desired mixing and/or homogenizing while axially transporting the components between the screw and the barrel, and discharging the product through the outlet.

In a preferred embodiment, the reactor of the present invention may also be used for conducting liquid phase reactions whereby the components introduced into and mixed in the reactor chemically react.

Thus, further according to the present invention there is provided a process for performing liquid phase reactions in a reactor in accordance with the invention which comprises introducing the components to a reaction to the mixing zone through the one or more inlets, relatively rotating the screw and the barrel to mix the components, causing the mixed components to react to produce a product, and discharging the product through the outlet.

The invention also extends to products produced by the reaction process.

In a preferred embodiment the outlet of the reactor of the present invention is connected or connectable to the inlet or to one of the inlets for recycling product.

Preferably the surface area defined on the wall of the barrel by the spiral groove is substantially smaller than the overall surface area defined on the wall of the barrel in the mixing zone by the screw.

The volume of the mixing zone of the reactor is the sum of the annular volumetric clearance between the lands of the screw and the wall of the barrel (the clearance volume) and the volume of the spiral groove (the groove volume). Normally, the mixing zone will be considered to extend axially between the at least one inlet and the discharge outlet. Preferably, the groove volume will be as small as possible while still effective to transport the mixing/reaction components and/or product through the mixing zone. However, because of the preferred small depth of the clearance volume, the groove volume is likely to comprise at least 50% of the volume of the mixing zone. The maximum ratio of the groove volume to the clearance volume is preferably about 5:1, more preferably about 3:1.

Preferably the volume of the groove is substantially smaller than the overall volume of the screw, for example in the range 1:10 to 1:50. In a laboratory scale embodiment of the reactor, the reactor screw may have a radius of about 15 mm, the spiral groove may have a depth of about 1-3 mm, the clearance volume may have a depth of about 0.01 to 3 mm, preferably 0.05 to 0.5 mm, and the overall mixing zone may have a volume in the range of about 0.5 to 10 $cm^3$. As a result of the relatively small groove volume and the narrow clearance volume, the reactor is able to continuously produce high quality and uniform slurry product. A grinding action of solids in the components of product in the clearance volume greatly assists in achieving a uniform product.

It will be understood that the effective volume, depth, pitch, and length of the spiral groove(s) and the geometry of the screw in general determine process parameters such as residence time and turbulence which influence the product quality and production rate. These aspects of the reactor may need to be optimised and adapted to the critical parameters of the mixing performed in the reactor.

Advantageously, the discharge outlet opens to the barrel interior on the axis of the barrel, and preferably the clearance volume is rounded, for example part-spherical, between cylindrical portions of the screw and barrel wall and the discharge outlet.

The reactor can be operated in a vertical position, horizontal position or on an incline. Preferably the reactor is operated in the vertical position with the discharge outlet at the lowermost end, as gravitational forces beneficially influence sealing and mass transport. The screw may rotate at from about 100 to about 10,000 rpm, preferably from 500 to 2,000 rpm, to achieve the desired turbulent mixing. The preferred rotational speed is less than that required in large batch reactors (typically more than 2,000 rpm) to achieve a similar degree of high turbulent mixing. This helps to reduce the fixed operating costs of the reactor of the present invention.

The effective transportation volume or mixing zone of the present reactor can be significantly less than that of batch reactors, leading to substantial advantage when relatively small quantities of product are required. Typically, the production rate (product throughput) using reactor of the present invention is from 0.25 to 0.75 kg/h, preferably about 0.5 kg/h.

Mixing may be performed at ambient or elevated temperatures.

In the reaction process, the individual components for reaction may be introduced into the barrel through respective inlets. Solvents, catalysts, moderators and/or carriers may be added to control or aid the mixing and reaction.

The residence time in the reactor is usually less than in a conventional batch reactor, requiring the rate of reaction to be rapid. However where incomplete or insufficient reaction has been achieved, the product obtained may be fed back into the reactor for a second or subsequent pass. The required recycle rate is largely determined by the reaction rate.

The temperature at which the components are reacted in the reactor may be from ambient up to 500° C. or more depending on the components, their concentrations and other factors. Heating may be achieved by reaction, by heating one or more of the reaction components and/or by heating the barrel and/or screw. Optionally, cooling of the reactor may be provided.

The reactor of the present invention can produce a slurry product, including a slurry precursor of a solid product. The product obtained may be a precipitate, co-precipitate or sol-gel, more preferably a precursor powder of uniform consistency and high quality. The product can be inorganic, organic or a mixture thereof.

In a preferred embodiment, the reactor of the present invention is used for powder precipitation. Typical reactions that may be performed in the reactor are precipitations and co-precipitations. These and other reactions can produce precursor solid products such as insoluble inorganic precursors of simple oxides, multi-component oxides, mixed oxides, or mixtures thereof having homogeneity and high dispersion. Such reaction products can lead to uniform, highly dispersed and high reactivity powders for further processing (eg. sintering to ceramic parts).

BRIEF DESCRIPTION OF THE DRAWINGS

Embodiments of the present invention will now be described by way of example only with reference to the following Examples and the accompanying drawing (FIG. 1), which is a diagrammatic cross-section of the reactor of the present invention. The Examples and drawing are not to be construed as limiting the invention in any way.

DETAILED DESCRIPTION OF THE INVENTION

Figure 1:
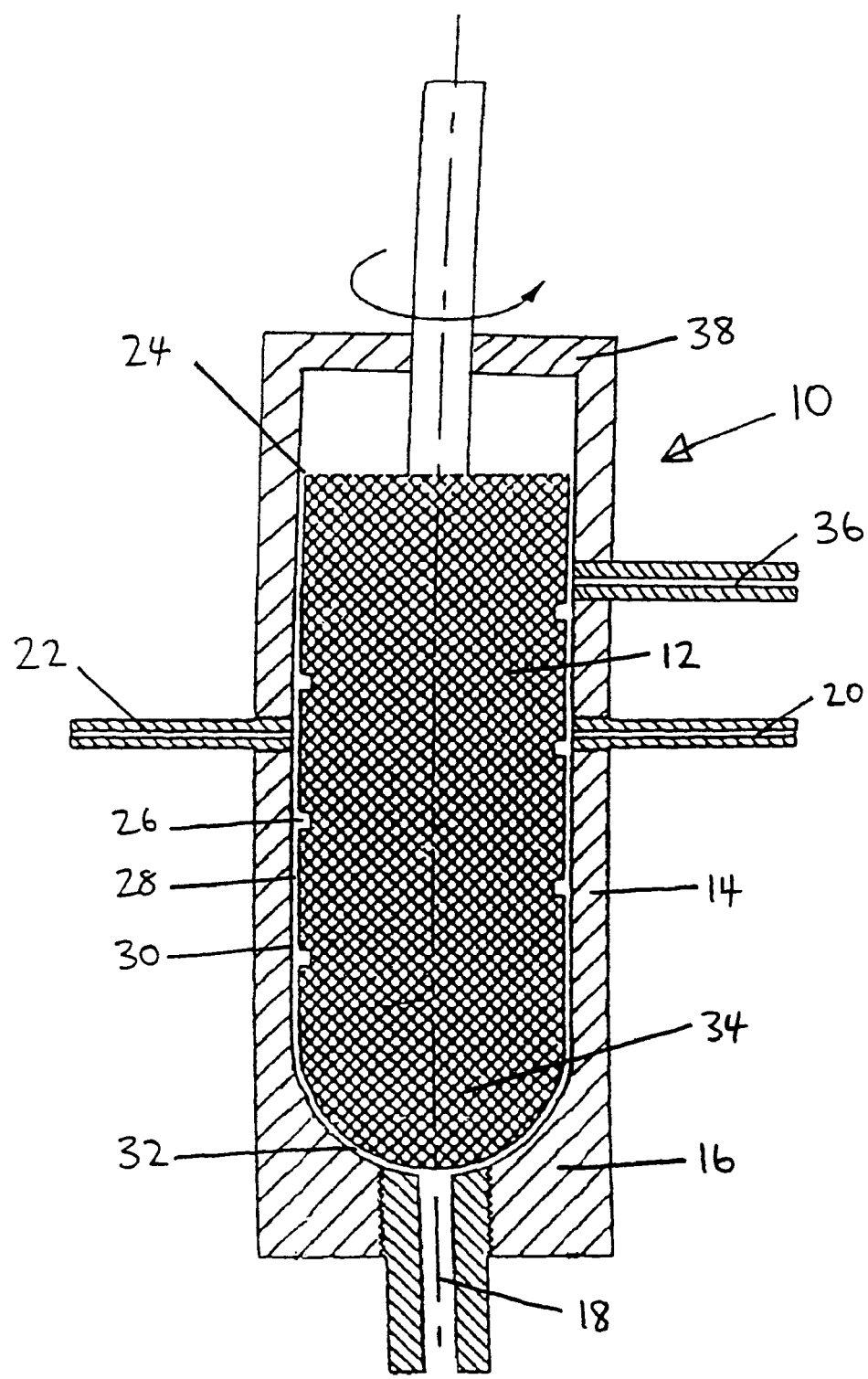

The drawing is a part-sectional representation of a laboratory-scale annular reactor. The drawing illustrates reactor 10 having a screw 12 rotatably supported in a barrel or cylinder 14. The axis of rotation of screw 12 is vertical. The screw has a rounded, part-spherical bottom end 34, and the cylinder 14 has a plugged, correspondingly-shaped bottom end 16 with an outlet 18 on the axis of rotation, and a closed top end 38. Components for reaction are fed into the reactor 10 through inlets 20 and 22, and recycled material from the discharge outlet 18 may be introduced through inlet 36. The inlets 20 and 22 are opposite one another part-way down the axial length of the cylinder and the inlet 36 for recycled material is disposed between the top 24 of the screw 12 and the inlets 20 and 22.

A cylindrical portion of the screw is provided with a surface spiral groove 26 for axially transporting and turbulently mixing the components as the screw is rotated. A clearance volume 28 and 32 between the screw 12 and the cylinder 14 combines with the groove volume to define a mixing zone, with the grinding of solids in the clearance volume greatly assisting the formation of a homogenous product. In the illustrated reactor 10, the clearance volume has a depth of about 0.1 mm. The volume and depth of the groove 26 is substantially less than the volume and radius, respectively, of the screw 12, the groove having a depth of about 2 mm while the screw has a radius of about 15 mm. The surface area defined by the groove 26 on the internal wall 30 of the cylinder 14 is substantially less than the land area between the portions of the groove and forms less than 10% of the overall surface area defined by the screw 12 on the internal wall 30 of the cylinder 14. The ratio of the volume of the groove 26 and the clearance volume 28 is about 2:1. The volume of the reaction zone of the laboratory scale reactor 10 as illustrated is about 1.5 cm3. A production scale reactor may be substantially larger.

Example 1

A stabilised zirconia powder of the composition 8 mol % yttria-zirconia was co-precipitated from a defined mixture of yttrium and zirconium nitrate and ammonia solution in the continuous flow reactor 10. The reaction produced a very homogenous precursor slurry at a rotation speed of 750 rpm and at a production rate of about 0.5 kg/h. The slurry was filtered and the resulting powder precursor calcined at 750° C. to achieve the product powder.

For comparison, the precipitation was also carried out at the same ratio in a conventional batch reactor at stirring rates of 2,000-3,000 rpm. The results are summarised in Table 1.

TABLE 1

|  | Continuous flow Reactor | Batch reactor |
| --- | --- | --- |
| Effective volume | 1.5 cm$^3$ | 60 L |
| Residence time | 1 sec | 4 h |
| Stir speed | 750 rpm | >2000 rpm |
| Power | 0.1 KW | 2.5 KW |
| Production Rate | 0.5 kg/h | 0.17 kg/h |
| Quality of product | Uniform, highly sinterable powder | Some inhomogeneity, low sintering reactivity |

Example 2

A perovskite of the composition $La_{0.8}Sr_{0.2}MnO_3$ was produced by co-precipitation from a mixed lanthanum-, strontium-, manganese-nitrate solution under the conditions outlined in Example 1. After filtration, drying and calcination at 800° C. a homogenous single phase perovskite powder was obtained. Again very high stilling rates (high energy consumption) was necessary in a conventional batch precipitator to achieve similar powder quality.

Other precipitations performed with the reactor 10 included scandia-zirconia, and other perovskites such as Lanthanum-strontium-chromite, and in all cases very uniform powder products were obtained.

Example 3

The reactor 10 is also useful for mixing/homogenization/dilution of slurries such as paints or inks. A slurry containing 50 wt % solids (titania powder) was passed through the reactor 10 with a measured amount of water to achieve 30% solids content. A very uniform slurry was obtained at a stirring rate of 1000 rpm.

Throughout this specification, unless the context requires otherwise, the word "comprise", and variations such as "comprises" and "comprising", will be understood to imply the inclusion of a stated integer or group of integers but not the exclusion of any other integer or group of integers.

Those skilled in the art would appreciate that the invention described herein is susceptible to variations and modifications other than those specifically described. It is to be understood that the invention includes all such variations and modifications. The invention also includes all of the steps, features, compositions and compounds referred to or indicated in this specification, individually or collectively, and any and all combinations of any two or more said steps or features.

The claims defining the invention are as follows:

1. A liquid phase continuous reactor comprising
   a screw rotatably disposed within a barrel, and defining a mixing zone therebetween,
   the barrel having at least two inlets for the introduction of components for mixing into the barrel and an outlet for the discharge of product from the barrel,
   the screw having at least one spiral groove whereby relative rotation of the screw with respect to the barrel is adapted to axially transport the components between the screw and the barrel while mixing the components and extruding the product through the outlet,
   wherein the land surface area between the spiral groove forms at least 50% of the surface area of the screw in the mixing zone,
   wherein the groove volume comprises at least 50% of the volume of the mixing zone, the mixing zone being the sum of the annular volumetric clearance between the lands of the screw and the wall of the barrel (the clearance volume) and the groove volume,
   wherein the maximum ratio of the groove volume to the clearance volume is about 5:1,
   wherein said at least two inlets are positioned opposite one another on the barrel and wherein said inlets are positioned part-way down the axial length of the barrel in the mixing zone,
   wherein the reactor is provided in the vertical position with the discharge outlet at the lowermost end,
   wherein the mixing zone, as defined by the barrel and the screw is substantially uniform along the length of the screw, and
   wherein the screw and the barrel have rounded and corresponding bottom ends.

2. The reactor according to claim 1, wherein the surface area defined on the wall of the barrel by the spiral groove is substantially smaller than the overall surface area defined on the wall of the barrel in the mixing zone by the screw.

3. The reactor according to claim 1, wherein the volume of the spiral groove (the groove volume) is as small as possible while still being effective to transport the components and/or product through the mixing zone.

4. The reactor according to claim 1, wherein the volume of the spiral groove is substantially smaller than the overall volume of the screw.

5. The reactor according to claim 4, wherein the ratio of the volume of the spiral groove to the overall volume of the screw is from 1:10 to 1:50.

6. The reactor according to claim 1, wherein the discharge outlet opens to the barrel interior on the axis of the barrel, and
   wherein the volume of the spiral groove is substantially smaller than the overall volume of the screw.

7. The reactor of claim 1, wherein the barrel and the screw have a substantially uniform dimension relative to each other.

8. The reactor or claim 1, wherein the turbulence imparted to the components during mixing has a Reynolds number of about 25,000 to 100,000.

9. A process for mixing or homogenizing components using a reactor as recited in claim 1 which comprises introducing the components to the mixing zone through the at least two inlets, rotating the screw relative to the barrel to produce the desired mixing and/or homogenizing while axially transporting the components between the screw and the barrel, and discharging the product through the outlet.

10. A process for performing a liquid phase reaction in a reactor as recited in claim 1 which comprises introducing the components for a reaction to the mixing zone through the at least two inlets, rotating the screw relative to the barrel to mix the components, allowing the mixed components to react to produce a product, and discharging the product through the outlet.

11. A process according to claim 10 wherein said reaction is a co-precipitation.

12. A process according to claim 10 wherein some of the product discharged from the outlet is fed to a third inlet as a recycle, and two of said at least two inlets are positioned on the axial length of the screw between the outlet and said third inlet.

13. A process according to claim 12 wherein said reaction is a co-precipitation.

14. A liquid phase continuous reactor comprising
    a screw rotatably disposed within a barrel, and defining a mixing zone therebetween,
    the barrel having at least two inlets for the introduction of components for mixing into the barrel and an outlet for the discharge of product from the barrel,
    the screw having at least one spiral groove whereby relative rotation of the screw with respect to the barrel is adapted to axially transport the components between the screw and the barrel while mixing the components and extruding the product through the outlet,
    wherein the land surface area between the spiral groove forms at least 50% of the surface area of the screw in the mixing zone,
    wherein the groove volume comprises at least 50% of the volume of the mixing zone, the mixing zone being the sum of the annular volumetric clearance between the lands of the screw and the wall of the barrel (the clearance volume) and the groove volume, wherein the maximum ratio of the groove volume to the clearance volume is about 5:1, wherein said at least two inlets are positioned opposite one another on the barrel and wherein said inlets are positioned part-way down the axial length of the barrel in the mixing zone, wherein the reactor is provided in the vertical position with the discharge outlet at the lowermost end, wherein the outlet of the reactor is connected to a third inlet for recycling product, wherein the mixing zone, as defined by the barrel and the screw is substantially uniform along the length of the screw, and wherein the at least two inlets are positioned on the axial length of the screw between the outlet and the third inlet.

15. A liquid phase continuous reactor comprising:

a screw rotatably disposed within a barrel, and defining a mixing zone therebetween, the barrel having at least two inlets for the introduction of components for mixing into the barrel and an outlet for the discharge of product from the barrel, the screw having at least one spiral groove whereby relative rotation of the screw with respect to the barrel is adapted to axially transport the components between the screw and the barrel while mixing the components and extruding the product through the outlet, wherein the land surface area between the spiral groove forms at least 50% of the surface area of the screw in the mixing zone, wherein the groove volume comprises at least 50% of the volume of the mixing zone, the mixing zone being the sum of the annular volumetric clearance between the lands of the screw and the wall of the barrel (the clearance volume) and the groove volume, wherein the maximum ratio of the groove volume to the clearance volume is about 5:1, wherein said at least two inlets are positioned opposite one another on the barrel and wherein said inlets are positioned part-way down the axial length of the barrel, and wherein the reactor is provided in the vertical position with the discharge outlet at the lowermost end, wherein the ratio of the volume of the spiral groove to the overall volume of the screw is from 1:10 to 1:50, and wherein the mixing zone, as defined by the barrel and the screw is substantially uniform along the length of the screw.

\* \* \* \* \*